United States Patent

Sato et al.

[11] Patent Number: 5,257,673
[45] Date of Patent: Nov. 2, 1993

[54] BRAKING CONTROL SYSTEM FOR A VEHICLE DRIVEN BY AN ELECTRIC MOTOR

[75] Inventors: Naoaki Sato; Jiro Kuramoto; Gonshiro Kawabata; Yasuhiro Yamamoto; Shigenori Kimura, all of Sakai, Japan

[73] Assignee: Kubota Corporation, Osaka, Japan

[21] Appl. No.: 828,287

[22] Filed: Jan. 30, 1992

[30] Foreign Application Priority Data

Jan. 31, 1991 [JP] Japan .................................. 3-10849
Apr. 5, 1991 [JP] Japan .................................. 3-072713

[51] Int. Cl.⁵ .................................................. B60K 28/02
[52] U.S. Cl. .................................. 180/271; 180/315; 180/907; 188/161; 192/1.21; 192/1.55; 200/61.85; 200/86.5; 200/293.1
[58] Field of Search .............. 180/271, 282, 315, 907; 200/61.85, 86.5, 293.1, 332.2; 188/161, 173; 192/1.21, 1.2, 1.55

[56] References Cited

U.S. PATENT DOCUMENTS

| | | | |
|---|---|---|---|
| 4,415,049 | 11/1983 | Wereb | 180/6.5 |
| 4,549,097 | 11/1985 | Ulmer | 200/61.85 |
| 4,788,463 | 11/1988 | Layh | 188/161 |
| 5,139,121 | 8/1992 | Kumura et al. | 192/1.43 |
| 5,161,634 | 11/1992 | Ichihara et al. | 180/179 |

FOREIGN PATENT DOCUMENTS

| | | | |
|---|---|---|---|
| 3200154 | 7/1983 | Fed. Rep. of Germany | 180/907 |
| 3820319 | 1/1989 | Fed. Rep. of Germany | 180/315 |
| 250409 | 10/1987 | German Democratic Rep. | 188/161 |
| 241940 | 2/1990 | Japan | 180/271 |

Primary Examiner—Eric D. Culbreth
Attorney, Agent, or Firm—Webb, Burden, Ziesenheim & Webb

[57] ABSTRACT

An emergency braking system for a vehicle driven by an electric motor. The vehicle includes a manually operable accelerator lever, a displacement detector for detecting displacement of the accelerator lever, an emergency detector disposed in a region of the accelerator lever for detecting an operating force applied to the accelerator lever, a braking device, and a control unit for receiving detection signals from the displacement detector and emergency detector, and outputting control signals to the electric motor and braking device. The control unit outputs the control signal to the braking device to brake the vehicle when the operating force detected by the emergency detector exceeds a predetermined value. In addition or as alternative to the emergency detector, the vehicle may include an emergency detector disposed in a driver's foot rest region for detecting a treading force of the driver.

6 Claims, 6 Drawing Sheets

BRAKING CONTROL SYSTEM FOR A VEHICLE DRIVEN BY AN ELECTRIC MOTOR

This application is related to co-pending U.S. patent application Ser. No. 07/670,986 directed towards electric vehicle speed control systems and co-pending U.S. application Ser. No. 07/793,625 directed towards braking systems for electric vehicles. These two patent applications are assigned to Kubota Corporation, the assignee of the present application.

BACKGROUND OF THE INVENTION

1. Field of the Invention

The present invention relates to a small vehicle driven by an electric motor and intended mainly for an aged person or a person having difficulties of walking, and more particularly to a braking control system of such a vehicle.

2. Description of the Related Art

In connection with a small electric vehicle of the type noted above, it has been proposed to detect an amount of operation of an accelerator lever with a potentiometer and control rotation of the propelling electric motor based on results of the detection. With the proposed system, when the driver releases the accelerator lever, a main switch of the electric motor is turned off to stop the vehicle.

According to this construction, the vehicle will automatically stop when the driver hastily releases the accelerator lever in an emergency such as a danger of the vehicle running into an obstacle. Thus, running safety is assured under certain conditions.

However, when abnormal circumstances including an emergency as noted above are encountered, the driver could grip the accelerator lever harder instead of releasing the lever. It is also known that the driver tends to stretch his or her legs hard in such an emergency. The above braking control system is ineffective with such behaviors of the driver at times of emergency.

SUMMARY OF THE INVENTION

The object of the present invention is to provide an electric vehicle having a braking control system which assures improved safety when the driver encounters an abnormal situation.

The above object is fulfilled, according to one aspect of the present invention, by a vehicle driven by an electric motor comprising a manually operable accelerator lever; a displacement detector for detecting displacement of the accelerator lever; an emergency detector disposed in a region of the accelerator lever for detecting an operating force applied to the accelerator lever; a braking device; and a control unit for receiving detection signals from the displacement detector and the emergency detector, and outputting control signals to the electric motor and the braking device, the control unit outputting the control signal to the braking device to brake the vehicle when the operating force detected by the emergency detector exceeds a predetermined value.

In another aspect of the invention, a vehicle driven by an electric motor comprises a manually operable accelerator lever; a displacement detector for detecting displacement of the accelerator lever; an emergency detector disposed in a driver's foot rest region and connected to the control unit for detecting a treading force of the driver; a braking device; and a control unit for receiving detection signals from the displacement detector and the emergency detector, and outputting control signals to the electric motor and the braking device, the control unit outputting the control signal to the braking device to brake the vehicle when the operating force detected by the emergency detector exceeds a predetermined value.

The former vehicle is automatically braked when the driver encounters an abnormal situation and, against his or her will, grips the accelerator lever hard instead of releasing the lever. Running safety is assured in such a condition.

The latter vehicle is automatically braked when the driver encounters an abnormal situation and stretches his or her leg against the foot rest hard.

The two types of braking control systems employed in the respective vehicles may of course be combined to provide the advantage of increased safety.

Other features and advantages of the present invention will be apparent from the description of the preferred embodiments to be had with reference to the drawings.

DETAILED DESCRIPTION OF THE PREFERRED EMBODIMENTS

Embodiments of the present invention will be described hereinafter with reference to the drawings.

Figure 1:
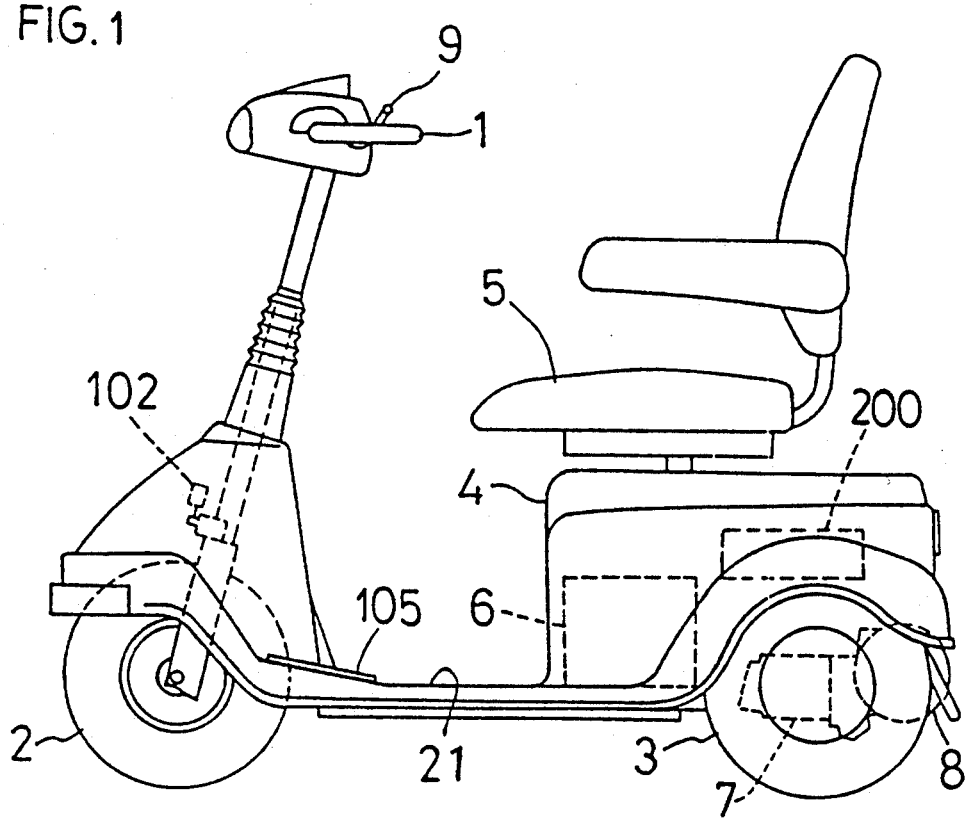
FIG. 1 is a side elevation of a small electric vehicle according to the present invention.

FIG. 1 shows a small electric vehicle according to the present invention. This electric vehicle has a steering handle 1, a single front wheel 2 steerable by the steering handle 1, right and left rear wheels 3, and a hollow vehicle body 4, a driver's seat 5 disposed on a rear part of the vehicle body 4, and a battery 6 and a running control unit 200 mounted in the vehicle body 4.

Figure 2:
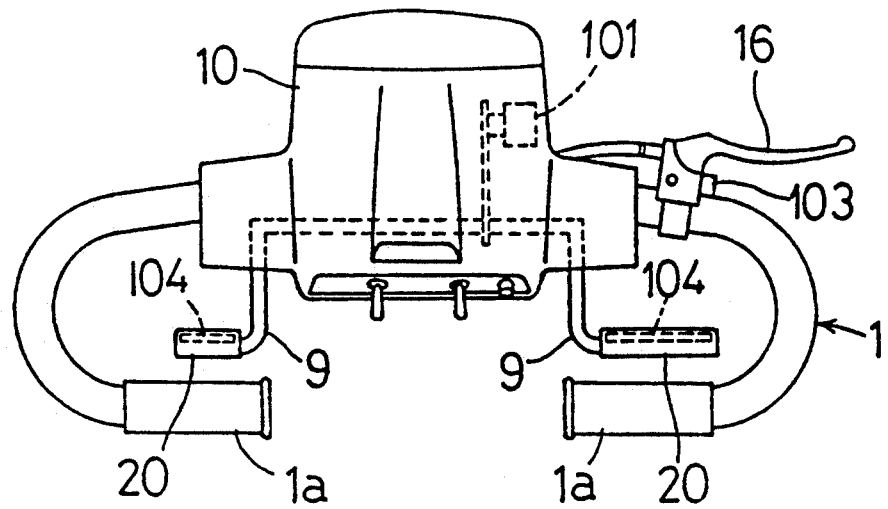
FIG. 2 is a plan view of a steering section.
Figure 3:
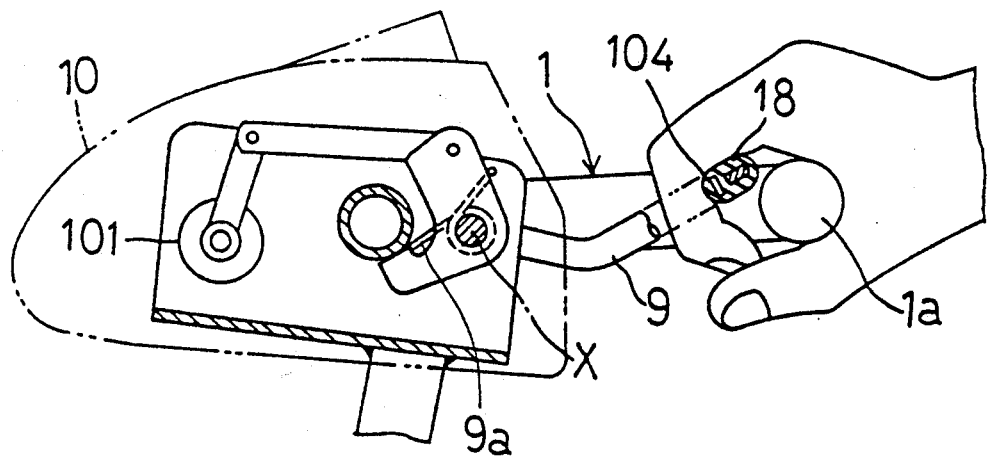
FIG. 3 is a fragmentary side view of a region including an accelerator lever.
Figure 4:
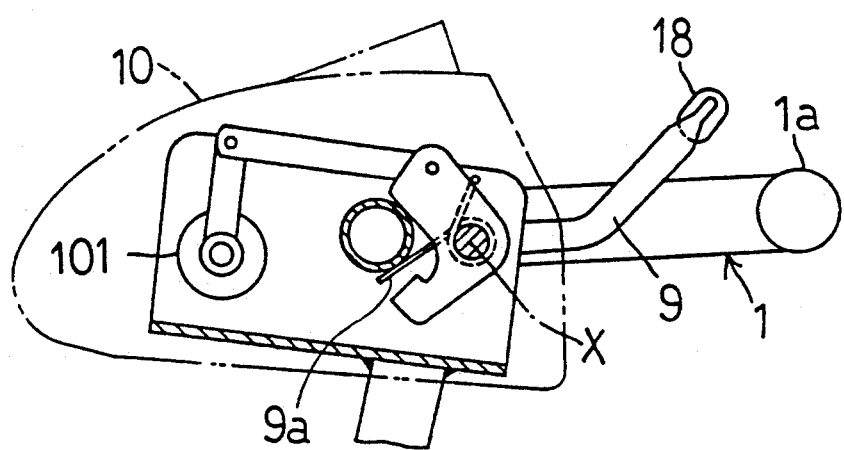
FIG. 4 is a view similar to FIG. 3 and showing the accelerator lever in home position.

A vehicle propelling system will be described first. The rear wheels 3 are driven by an electric motor 8 having a speed reducer, through a propelling transmission line 7 including a clutch 7a. Running speed of the vehicle is controllable by a signal outputted from the control unit 200 to the motor 8 based on an amount of operation of an accelerator lever 9 disposed adjacent the steering handle 1 to be held with grips 1a of the steering handle 1 by the driver. As shown in FIGS. 2 through 4, the accelerator lever 9 is disposed, to be pivotable about a transverse axis, adjacent right and left grips 1a formed on opposite ends of the steering handle 1. Amount of pivotal movement of the accelerator lever 9 is detected by a potentiometer 101 mounted inside a control panel case 10. The potentiometer 101 transmits a detection signal to the control unit 200 for processing, and rotational rate of the electric motor 8 is controlled on results of the processing. The accelerator lever 9, when out of operation, is returned to home position by a return spring 9a. When the accelerator lever 9 is out of operation, i.e. in home position, the control unit 200 stops the electric motor 8, and actuates an electromagnetic brake 11 mounted in the propelling transmission line 7. The electromagnetic brake 11 has a solenoid energized to move spring-loaded brake shoes out of contact with brake drums to release the brakes. When de-energized, the solenoid allows the brake shoes to be pressed on the brake drums under the spring load.

Figure 5:
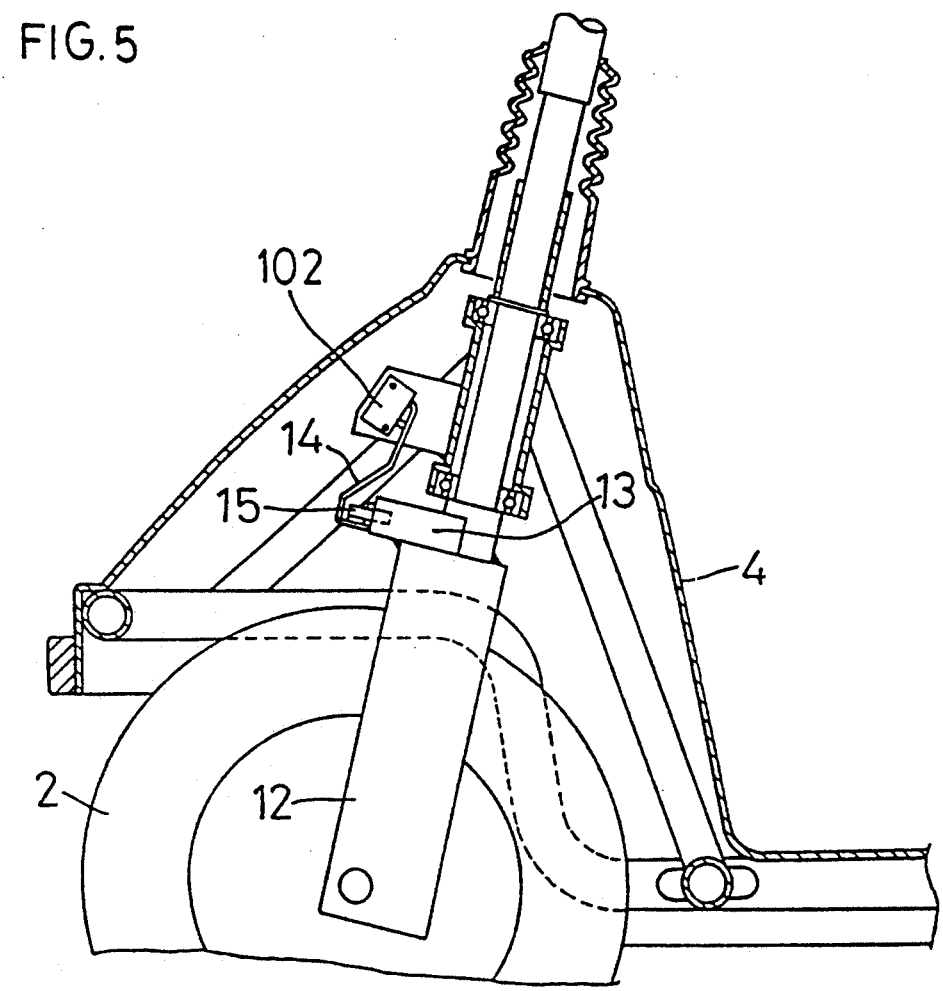
FIG. 5 is a side view, partly in section, showing position of a limit switch for detecting a steering angle.
Figure 6:
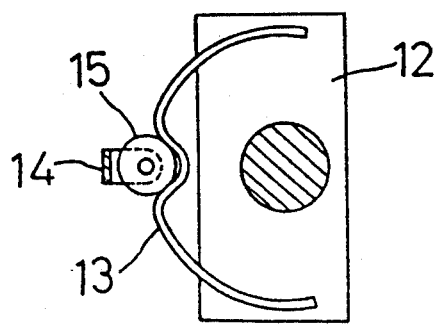
FIG. 6 is a plan view of a region including the limit switch.

As shown in FIGS. 5 and 6, a limit switch 102 is mounted in a forward part of the vehicle body 4 for detecting operation of the steering handle 1 in excess of a predetermined steering angle. More particularly, a cam element 13 in the form of a half cylinder indented at an intermediate position is mounted on an upper surface of a front wheel supporting stay 12. The limit switch 102 has a leaf spring type detecting piece 14 contacting the cam element 13 through a guide roller 15. When the steering handle 1 is turned in excess of the predetermined steering angle, the detecting piece 14 is actuated to operate the limit switch 102. When the limit switch 102 is operated while the vehicle is running, the vehicle is decelerated to a predetermined speed regardless of a speed set by the accelerator lever 9. The limit switch 102 is connected to the control unit 200 for this purpose.

As shown in FIG. 2, a brake lever 16 is mounted forwardly of a righthand portion of the steering handle 1 for operating manually operable friction brakes 17 interposed between the electromagnetic brake 11 and rear wheels 3. A detection switch 103 is disposed adjacent a proximal end of the brake lever 16 for detecting operation of the lever 16. This detection switch 103 is connected to the control unit 200 to realize a control function described later.

Figure 7:
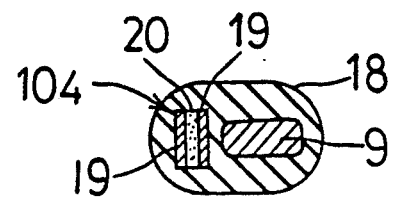
FIG. 7 is a sectional view of a pressure sensor.

Further, as shown in FIGS. 3 and 7, a pressure sensor 104 is disposed in a predetermined position on each grip of the accelerator lever 9. This sensor 104 is energized under a predetermined pressure for detecting a gripping action exceeding the predetermined pressure. The pressure sensor 104 also is connected to the control unit 200. As seen from FIG. 7, the pressure sensor 104 is embedded in an elastic member 18 covering the grip of the accelerator lever 9, and includes a pair of switching pole plates 19 and a pressure sensitive conductive rubber 20 sandwiched therebetween.

The vehicle may include, in addition or as alternative to the sensors 104 for detecting an accelerator lever gripping pressure, a function to detect treading pressure of the driver's feet which is highly likely to occur at times of emergency. This embodiment provides both detecting functions. For this purpose, as seen from FIG. 1, pressure sensors 105 are arranged in right and left regions 21 defined on the vehicle body 4, for detecting a treading pressure exceeding a foot resting pressure occurring at normal driving times. The pressure sensors 105 are connected to the control unit 200. Though details of the pressure sensors 105 are not illustrated, each sensor is embedded in an elastic sheet, and includes a pressure sensitive conductive rubber sandwiched between a pair of switching pole plates.

Figure 8:
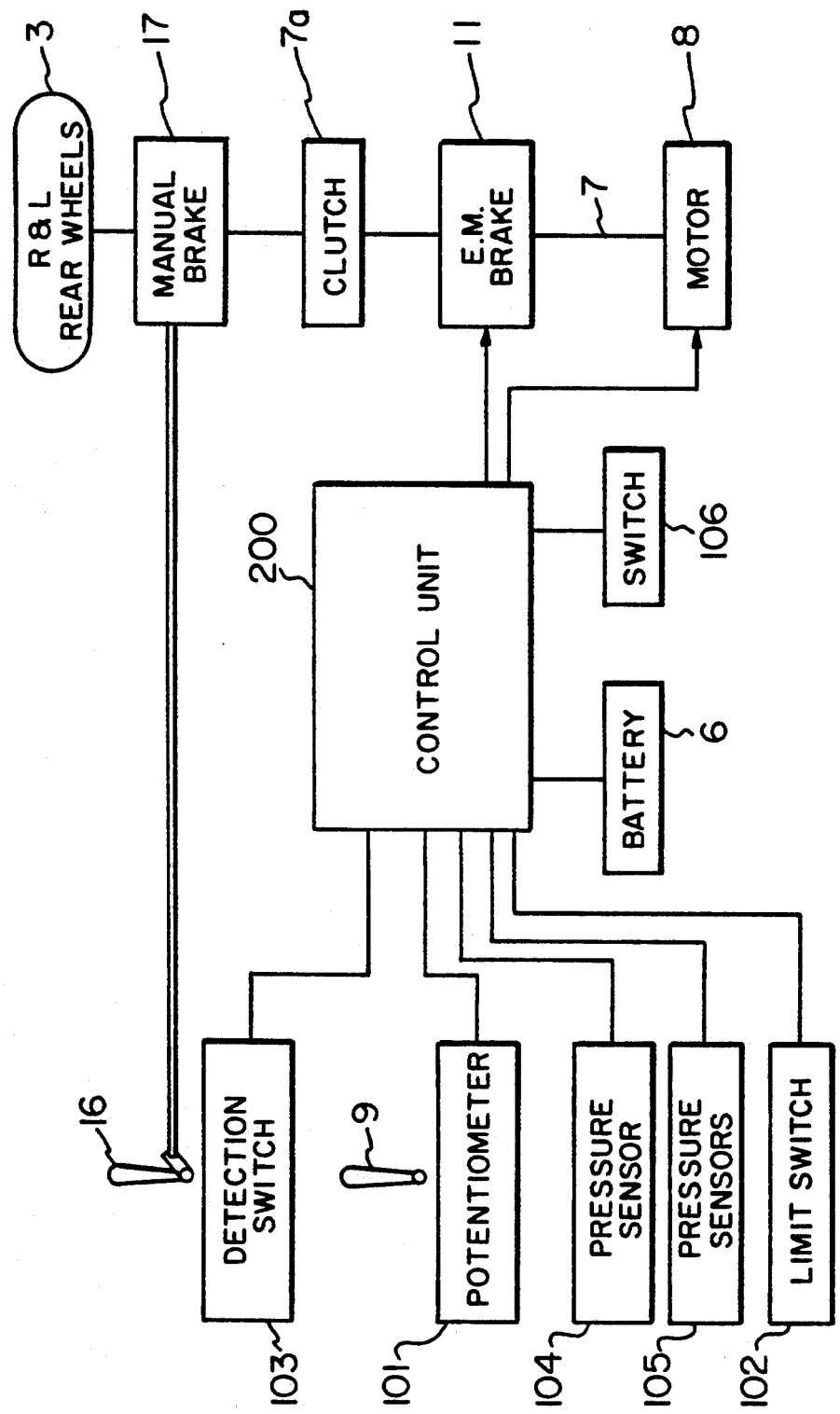
FIG. 8 is a block diagram of a control system.

FIG. 8 shows a block diagram of a control system according to the present invention, in which the control unit 200 acts as a central component. The control unit 200 receives signals from the potentiometer 101 for detecting displacement of the accelerator lever 9, the potentiometer 102 for detecting a steering angle, the detection switch 103 for detecting operation of the manual brakes, the pressure sensors 104 for detecting gripping pressures and the pressure sensors 105 for detecting treading pressures, and outputs control signals to the motor 8 and electromagnetic brake 11.

Figure 9:
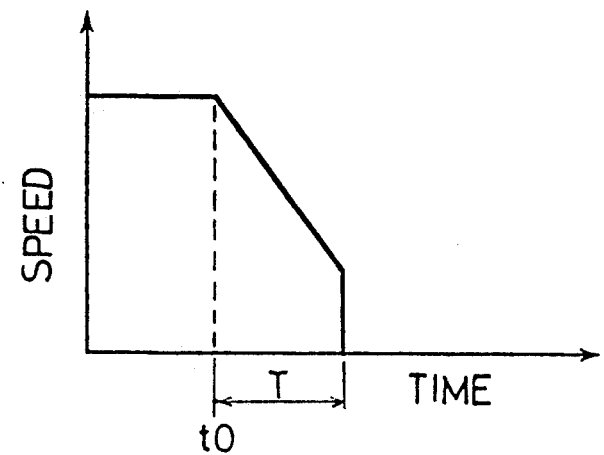
FIG. 9 is a view showing speed control characteristics.

The way in which the control unit 200 acts upon input of the signals from the potentiometer 101 for detecting displacement of the accelerator lever 9 and the potentiometer 102 for detecting a steering angle is already described and will not be repeated. When the detection switch 103 for detecting operation of the manual brakes is operated, the control unit 200 is operable, as shown in FIG. 9, to slow down the vehicle gradually by reducing rotational rate of the electric motor 8 and causing the electromagnetic brake 11 to apply a braking force less than its maximum braking force from a point of time: t0 at which the switch 103 detects operation of the manual brakes till lapse of a predetermined time: T. Upon lapse of the predetermined time, the control unit 200 stops power supply to the electric motor 8, and causes the electromagnetic brake 11 to apply the maximum braking force.

When either gripping pressure sensors 104 is electrified, the control unit 200 is operable, as when the switch 103 detects operation of the manual brakes, to lower running speed gradually from a point of time of electrification. Upon lapse of the predetermined time therefrom, the control unit 200 stops power supply to the electric motor 8 and causes the electromagnetic brake 11 to apply the maximum braking force.

Consequently, the vehicle is brought to a halt reliably without strong shocks even when the driver, against his or her will, grips the accelerator lever 9 hard instead of releasing the lever 9 in an emergency such as a possible danger of colliding with an obstacle during running of the vehicle.

When either treading pressure sensor 105 is electrified, the control unit 200 is operable, as when the gripping pressure sensor 104 is electrified, to lower running speed gradually from a point of time of electrification. Upon lapse of the predetermined time therefrom, the control unit 200 stops power supply to the electric motor 8 and causes the electromagnetic brake 11 to apply the maximum braking force.

Again, the vehicle is brought to a halt reliably without strong shocks when the driver, against his or her will, stretches his or her legs hard instead of releasing the accelerator lever 9 in an emergency situation.

With regard to the control based on the treading pressure, a pedal may be provided specially for this purpose. In this case, the vehicle is capable of running when the pedal is depressed with a small pressure, and is brought to a halt when the pedal is depressed hard with a pressure exceeding a predetermined pressure or when the pedal is freed.

Figure 10:
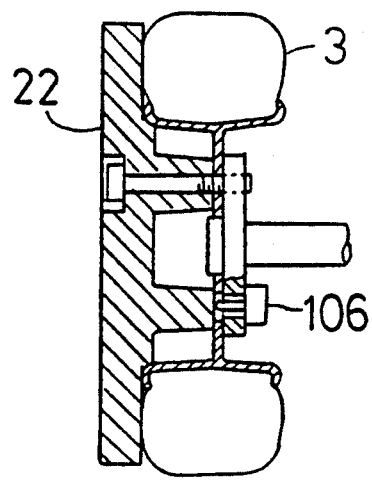
FIG. 10 is a fragmentary rear view of a rear wheel having an auxiliary disk.

In addition, a switch 106 is connected to the control unit 200. As shown in FIG. 10, an auxiliary disk 22 formed of hard rubber or plastic is attachable laterally of each rear wheel 3 of the vehicle in this embodiment. The auxiliary disk 22 is used when the rear wheel 3 has punctured or otherwise lost air, to allow the vehicle to run without damage to the rear wheel 3. The switch 106 of the contact or noncontact type is provided to notify the control unit 200 that the auxiliary disk 22 is attached. When this switch 106 operates, i.e. when the vehicle runs with the auxiliary disk 22, the control unit 200 limits running speed to a much lower level than for ordinary running.

The control unit 200 may be provided in various forms. For example, the entire control unit may comprise a board computer which is itself known. In this case, the signals from the potentiometer 101 for detecting displacement of the accelerator lever 9, the potentiometer 102 for detecting a steering angle, the detection switch 103 for detecting operation of the manual brakes, the gripping pressure sensors 104 and the treading pressure sensors 105 are received through an I/O interface and temporarily stored in a RAM. The board computer includes a ROM for storing a program for gradually reducing rotating rate of the electric motor, a program for actuating the electromagnetic brake below the maximum braking force, a program for stopping the electric motor and a program for actuating the electromagnetic brake to apply the maximum braking force upon lapse of the predetermined time after input of the various signals in an emergency situation, as well as a main control program. A CPU generates control signals based on these programs for controlling the electromagnetic brake 11 through a brake driver and the motor 8 through a motor driver. The CPU has an internal counter for measuring the predetermined time following the points of time of detection.

Figure 11:
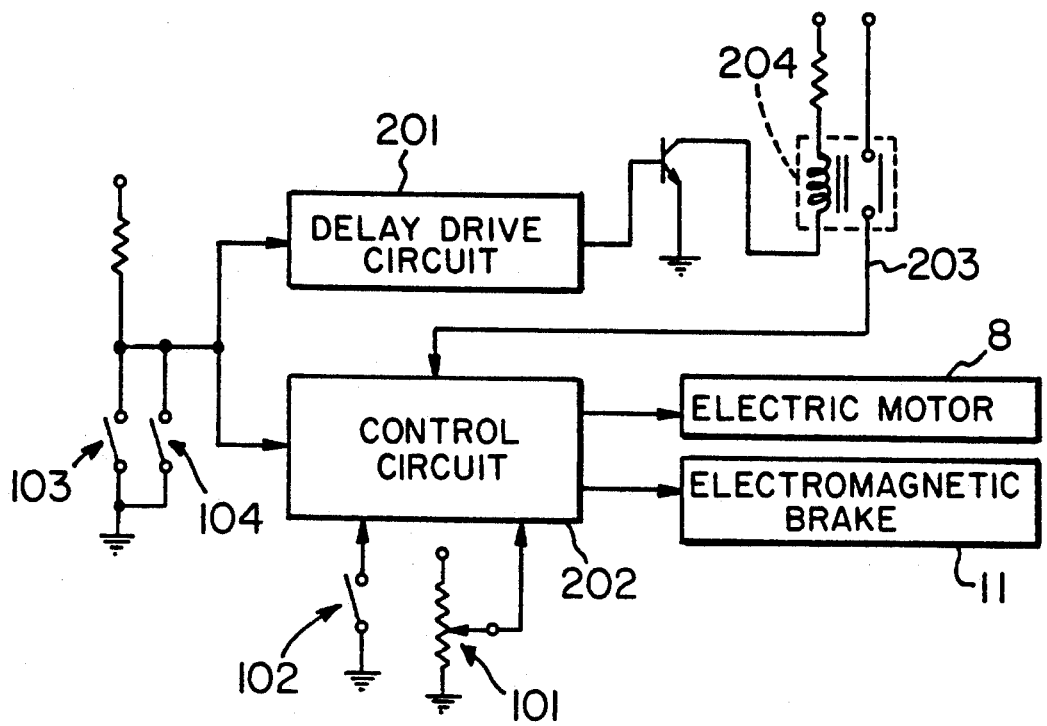
FIG. 11 is a block diagram of a control system in another embodiment.

FIG. 11 shows another modified example of the control unit. In this example, the control unit includes a delay drive circuit 201 and a control circuit 202. When the switch 103 detects operation of the manual brakes, the control circuit 202 is operable to reduce running speed gradually from a point of time of detection: t0. Upon lapse of a predetermined time therefrom, the delay drive circuit 201 operates to open a relay circuit 203 mounted in a main source circuit 204 connected to the control circuit 202. The gripping pressure sensors 104 and brake detection switch 103 are connected in parallel to the control circuit 202. In response to electrification of the gripping pressure sensors 104, the control circuit 202 is operable, as when the manual brakes are applied, to reduce running speed gradually from a point of time of electrification. Upon lapse of the predetermined time therefrom, the delay drive circuit 201 operates to open the relay circuit 203 mounted in the main source circuit 204 connected to the control circuit 202.

Figure 12:
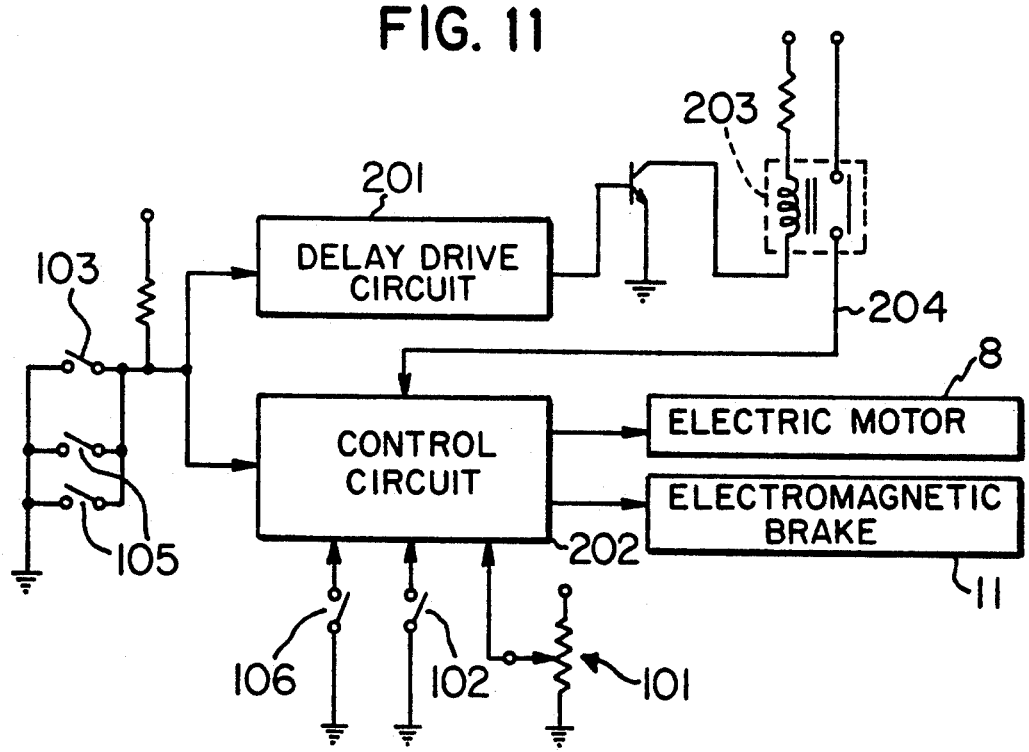
FIG. 12 is a block diagram of a control system in a further embodiment.

FIG. 12 shows a further example of the control unit which is substantially the same as the example shown in FIG. 11. In this example, the treading pressure sensors 105 are used in place of the gripping pressure sensors 104. Further, the switch 106 for detecting the auxiliary disk 22 is connected to the control circuit 202. This example is the same as the foregoing example, and so is its control method, and the description thereof will not be repeated.

What is claimed is:

1. A vehicle driven by an electric motor comprising:
   a brake device for braking the vehicle;
   a manually operable accelerator lever means including a handle lever displaceable between a lowest speed position acting as home position and a highest speed position acting as operation end position;
   displacement detecting means for detecting displacement of said handle lever;
   emergency detecting means disposed in a region of said handle lever for detecting an operating force applied to said handle lever at an arbitrary position between said lowest speed position and said highest speed position; and
   control means for receiving detection signals from said displacement detecting means and said emergency detecting means, and outputting control signals to said electric motor and said brake device, said control means outputting the control signal to said brake device to brake the vehicle when the operating force applied to said handle lever and detected by said emergency detecting means exceeds a predetermined value.

2. A vehicle as claimed in claim 1, further comprising:
   a manually operable brake lever;
   brake means operatively connected to said manually operable brake lever for producing a braking force based on an operating force applied to said brake lever; and
   braking operation detecting means connected to said control means for detecting operation of said brake lever, said control means being operable to output the control signal to said brake device to brake the vehicle in response to a detection signal received from said braking operation detecting means.

3. A vehicle as claimed in claim 1, further comprising additional emergency detecting means disposed in a driver's foot rest region and connected to said control means for detecting a treading force of the driver, said control means outputting the control signal to said brake device to brake the vehicle when a pressure detected by said additional detecting means exceeds a predetermined value.

4. A vehicle as claimed in claim 1, wherein said accelerator lever means includes a grip that can be gripped with said handle lever together, and said emergency detecting means includes a pressure sensor for detecting a gripping force applied to said handle lever and said grip.

5. A vehicle as claimed in claim 4, wherein said pressure sensor is disposed in said handle lever.

6. A vehicle as claimed in claim 4, wherein said handle lever is pivotable about a transverse axis and said pressure sensor detects a pressure in a direction different from a pivotal direction of said handle lever.

* * * * *